US012649250B1

(12) United States Patent
Williams et al.

(10) Patent No.: US 12,649,250 B1
(45) Date of Patent: Jun. 9, 2026

(54) NEGATIVE PRESSURE CONTAINMENT SYSTEM HAVING A MULTIFUNCTIONAL AIR DIVERTER

(71) Applicant: Flow Sciences, Inc., Leland, NC (US)

(72) Inventors: Howard Scott Williams, Wilmington, NC (US); Allan James Goodman, Lake Waccamaw, NC (US)

(73) Assignee: Flow Sciences, Inc., Wilmington, NC (US)

( * ) Notice: Subject to any disclaimer, the term of this patent is extended or adjusted under 35 U.S.C. 154(b) by 0 days.

(21) Appl. No.: 18/747,057

(22) Filed: Jun. 18, 2024

Related U.S. Application Data

(62) Division of application No. 17/241,252, filed on Apr. 27, 2021, now Pat. No. 12,011,826.

(51) Int. Cl.
B25J 21/02 (2006.01)
F24F 13/08 (2006.01)

(52) U.S. Cl.
CPC ............... B25J 21/02 (2013.01); F24F 13/08 (2013.01)

(58) Field of Classification Search
CPC .................................. F24F 13/08; B25J 21/02
USPC ............................................................ 312/1
See application file for complete search history.

(56) References Cited

U.S. PATENT DOCUMENTS

| | | | | |
|---|---|---|---|---|
| 4,704,951 A | * | 11/1987 | Pruchon | F16K 17/12 |
| | | | | 55/385.2 |
| 5,316,560 A | | 5/1994 | Krone-Schmidt | |
| 5,976,871 A | | 11/1999 | Walker | |
| 6,010,400 A | | 1/2000 | Krainiak | |
| 6,235,072 B1 | * | 5/2001 | Kopylov | B01D 46/90 |
| | | | | 55/385.2 |
| 8,034,141 B2 | | 10/2011 | Polsky | |
| 9,895,689 B2 | | 2/2018 | Wright | |
| 2009/0056547 A1 | * | 3/2009 | Huza | B01D 46/88 |
| | | | | 96/372 |
| 2014/0232248 A1 | | 8/2014 | Boast | |
| 2021/0231322 A1 | | 7/2021 | Han | |

FOREIGN PATENT DOCUMENTS

WO        WO 2020040430         2/2020

* cited by examiner

*Primary Examiner* — James O Hansen
(74) *Attorney, Agent, or Firm* — MacCord Mason PLLC

(57) ABSTRACT

A negative pressure containment system is configured to run in lateral air flow mode or enhanced controlled environment mode, depending on the operator's needs. A diverter assembly facilitates switching between modes by directing air into alternative air chases. In the enhanced controlled environment mode there are two concurrent air paths that eventually converge, with one path being a bypass flow that creates negative pressure in the main chamber and another path being compressed air that feeds the main chamber. In this mode it is possible to precisely control the chamber environment.

9 Claims, 9 Drawing Sheets

NEGATIVE PRESSURE CONTAINMENT SYSTEM HAVING A MULTIFUNCTIONAL AIR DIVERTER

BACKGROUND OF THE INVENTION

The present invention relates generally to containment systems, and more particularly, to a negative pressure glovebox containment system having a multifunctional air diverter.

Containment systems such as gloveboxes are widely used in industries where it is desirable to isolate, manipulate and/or analyze substances in a controlled environment, while also providing a high level of protection for the operator. For example one might weigh a highly hygroscopic and toxic chemical compound within a glovebox having low relative humidity for increased accuracy in weighing and to protect personnel against potentially harmful exposure.

Containment systems can generally be categorized as positive pressure, where the pressure inside the containment system's chamber is greater than the pressure outside of it, or negative pressure, where the pressure inside the chamber is less than outside of it. Typically gas is pumped into a conventional positive pressure system to establish that positive pressure. This system is desirable insofar as the environment within the chamber can be controlled by utilizing gas having properties desirable for the specific process, for example varying the level of oxygen and/or humidity. One issue that can arise in a positive pressure system though, is with a glove breach or other event that creates a direct path between the interior and the user. This can lead to exposure of personnel to the materials inside the enclosure, which can be problematic if the compounds are noxious or toxic in nature. For this reason positive pressure systems are generally considered to better protect the process than the person. A generic positive pressure system is schematically represented in FIG. 1.

Conversely, with a conventional negative pressure system, a breach of the system would result in an influx of ambient air into the chamber, containing the contaminated contents of the chamber, thereby protecting the personnel. The downside of a conventional negative pressure containment system, however, is that it draws ambient air into the chamber, which means that properties such as oxygen level and humidity cannot be precisely controlled. Negative pressure systems are generally considered to better protect the person than the process. A generic negative pressure system is schematically represented in FIG. 2.

Ideally a containment system would enable the best features from positive pressure (atmospheric control) and negative pressure systems to be integrated so that both the process and the person can be protected.

As can be seen, there is a need for an improved containment system that can protect both the process and the person. It is desirable that this system is configured to operate in various modes so it is suitable for a variety of processes. It is also desirable that this system has a familiar look-and-feel to other containment systems so trained personnel are comfortable in its operation.

SUMMARY OF THE INVENTION

The present invention is a containment system, preferably a glovebox system, that is configured to run in two different modes depending on the needs of the operator.

The lateral air flow mode brings in ambient air, passes it through an intake and into a diverter housing where a diverter assembly will direct the air into a lateral flow air chase that feeds the main chamber. Potentially contaminated air, from processes performed within, leaves the chamber, passes through several filters, and is released into ambient. This is a negative pressure system.

The enhanced controlled environment mode has two air paths that eventually meet. The first path brings ambient air through an intake and into the diverter housing where the diverter assembly directs the air into a bypass flow air chase, through several filters, and is released into ambient. This is the bypass flow path. The second path feeds compressed air or inert gases into the chamber, through several filters, and is released into ambient. This is the compressed gas flow path. The two paths converge before passing through several filters prior to being released into ambient. This is a net negative pressure system.

A diverter assembly enables the system to switch between lateral air flow mode and enhanced controlled environment mode by directing air into a lateral flow air chase or a bypass flow air chase, respectively.

Whether the system operates in lateral air flow mode or enhanced controlled environment mode is determined by operator input or operational conditions. This is facilitated by a system monitoring box having a graphic user interface, and integrated hardware and logic.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The following structure numbers set forth the following structures among the various figures:

10—Containment system;
12—Ambient air;
13—Ambient inlet;
14—Exhaust;
20—Main chamber;
21—Glove aperture;

22—Gloves;
24—Pass thru;
26—Bulk powder chamber;
27—Intake;
30—Diverter housing;
31—Bypass filters compartment;
33—Diverter assembly;
34—Diverter inlet;
35—Wall;
36—Upper gate valve;
37—Lower gate valve;
38—Gate valve shaft;
39—Gate valve shaft motor;
40—Lateral flow path;
41—Lateral flow chase inlet;
42—Lateral flow air chase;
44—Lateral flow main chamber inlet;
45—Lateral flow main chamber outlet;
50—Bypass flow path;
51—Bypass air chase inlet;
52—Bypass flow air chase;
54—Bypass flow outlet port;
55—Cylindrical filter;
56—Compressed gas inlet;
58—Compressed gas;
59—Compressed gas flow path;
60—Outlet filter housing;
61—BIBO filter;
62—Secondary HEPA filter;
65—Filter housing inlet;
70—Exhaust fan;
75—Exhaust fan inlet;
80—System monitoring box;
82—Graphic user interface;
83—Primary power/control box and
84—Secondary power/control box.

As used herein, "gas" and "air" are interchangeable unless the context suggests otherwise. These terms generally refer to matter in the gaseous state including compressed gas such as oxygen or nitrogen, and ambient air. Gas and air may contain moisture.

As used herein, "person", "personnel" and "operator" are interchangeable unless the context suggests otherwise. These terms generally refer to people who use the system or are nearby when the system is in use.

Figure 1:
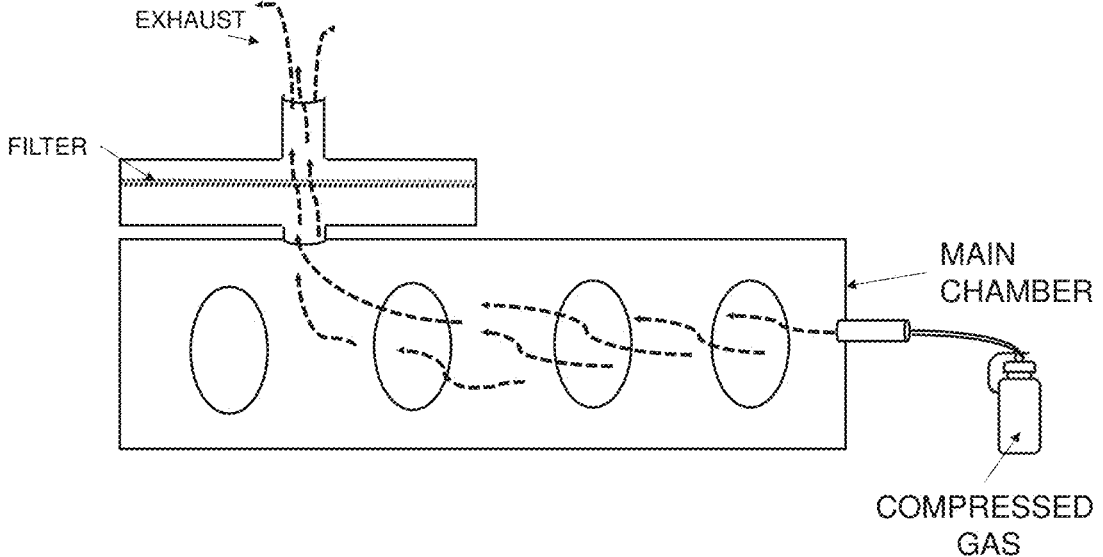
FIG. 1 schematically represents a positive pressure system according to the prior art.
Figure 2:
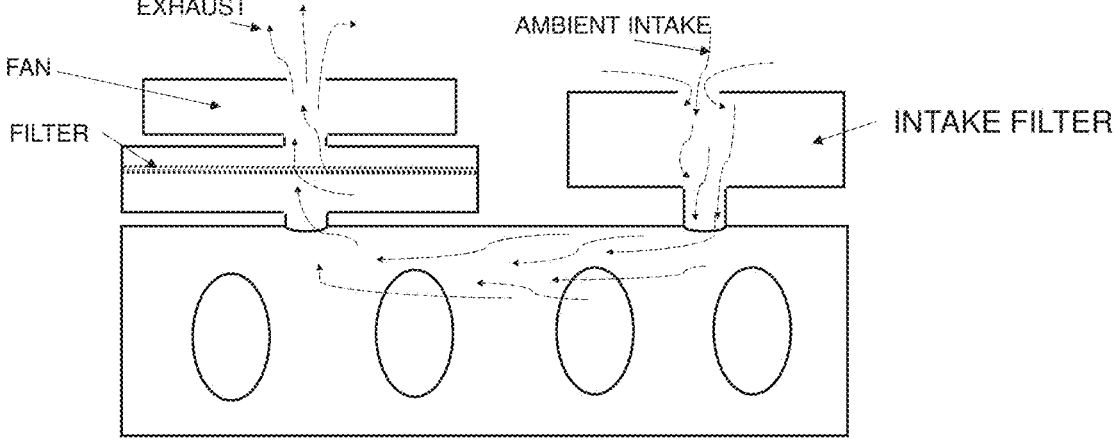
FIG. 2 schematically represents a negative pressure system according to the prior art.
Figure 3:
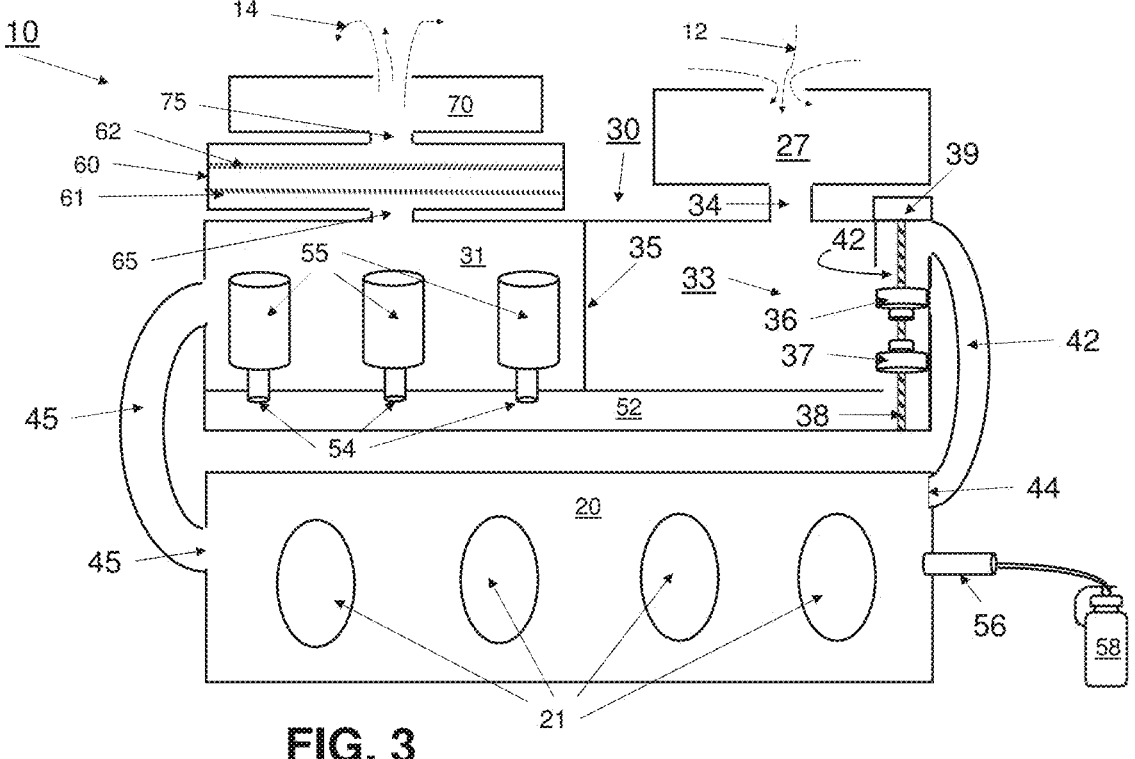
FIG. 3 schematically represents some of the major components of a system according to the present invention.

Referring to FIG. 3, some of the major structures of containment system 10 include intake 27, diverter housing 30, main chamber 20, outlet filter housing 60 and exhaust fan 70.

In a preferred embodiment intake 27 is a HEPA filter that is at least 99.995% efficient at the most penetrating particle size (mpps) and capable of maintaining that efficiency at the desired flow rate.

Diverter housing 30 preferably has two sides separated by wall 35, with one side including diverter assembly 33 and the other side defining bypass filter compartment 31 including a plurality of cylindrical filters 55.

Diverter assembly 33 preferably includes gate valve shaft 38 driven by gate valve shaft motor 39. Upper gate valve 36 and lower gate valve 37 are spaced one from the other and are raised or lowered depending on which air chases are to be opened or closed.

Running along the edge of diverter housing 30 and spanning both sides is bypass flow air chase 52 which directs air through a plurality of bypass flow outlet ports 54 that each feed into individual cylindrical filters 55. In a preferred embodiment each cylindrical filter is a HEPA filter that is at least 99.995% efficient at the most penetrating particle size (mpps) and capable of maintaining that efficiency at the desired flow rate. While three filters are shown it should be understood that more or less filters could be employed and are within the scope of the invention. Air leaves diverter housing 30 through filter housing inlet 65.

Figure 6:
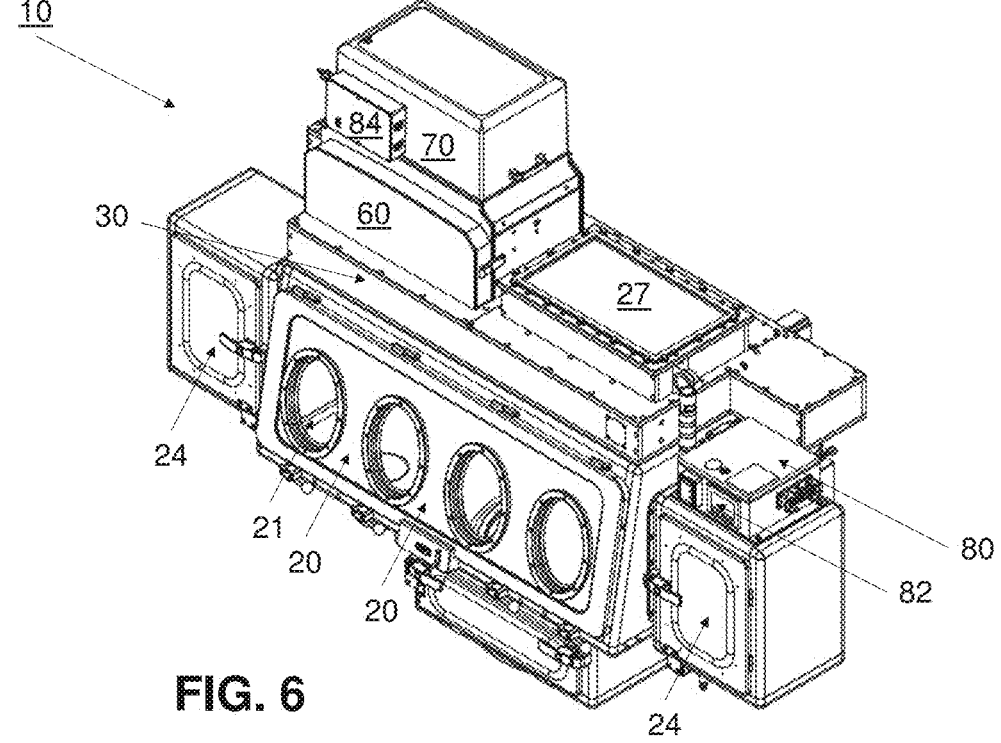
FIG. 6 is a front perspective view of an embodiment of the present invention.
Figure 7:
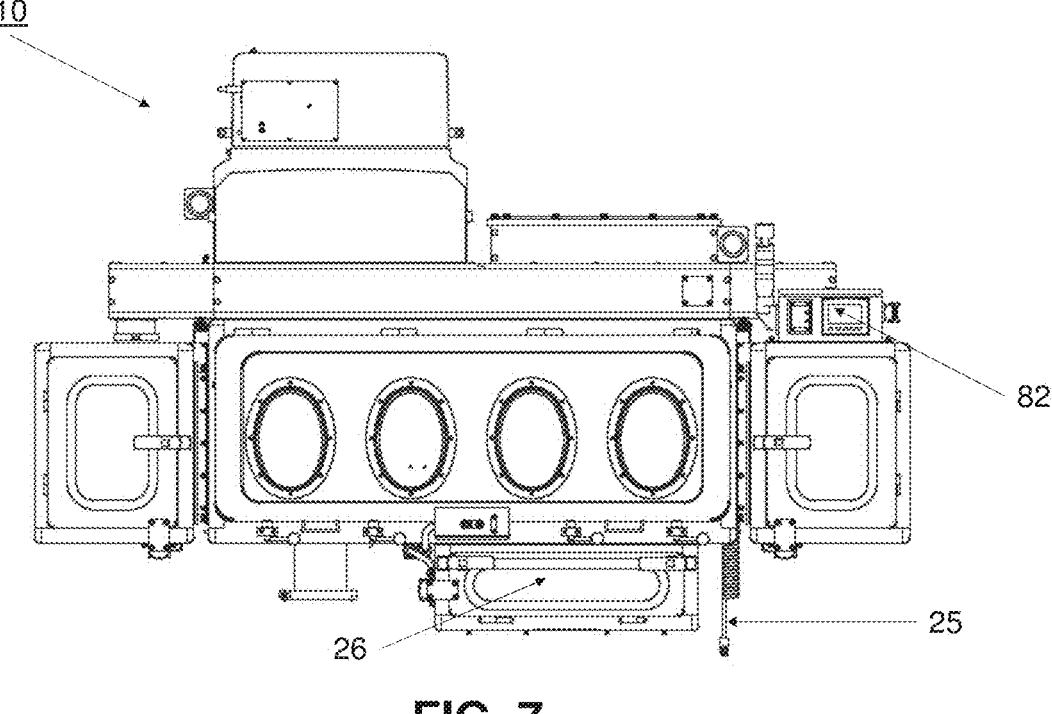
FIG. 7 is a front view of an embodiment of the present invention.
Figure 8:
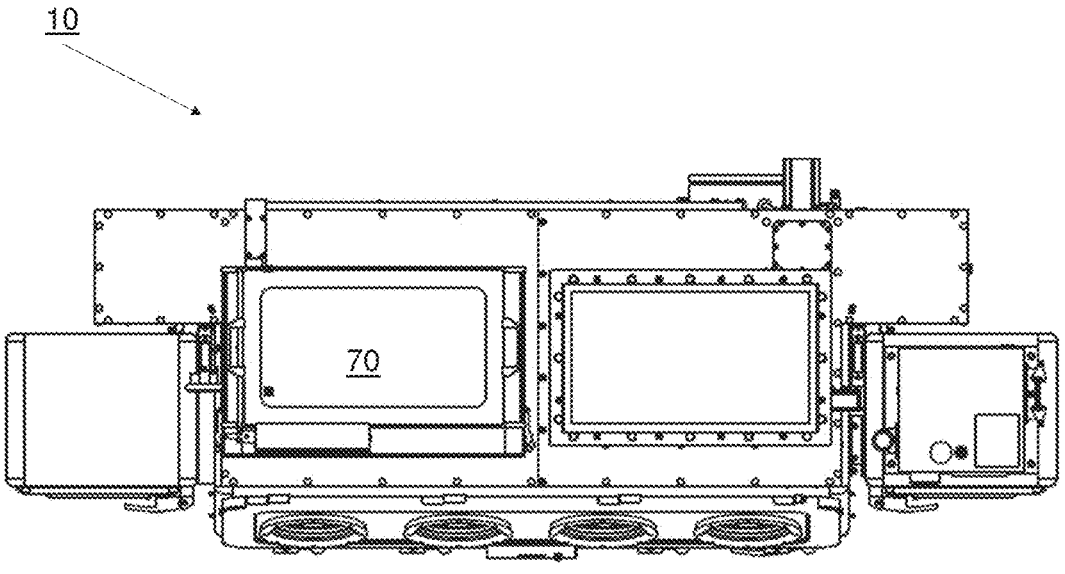
FIG. 8 is a top view of an embodiment of the present invention.
Figure 9:
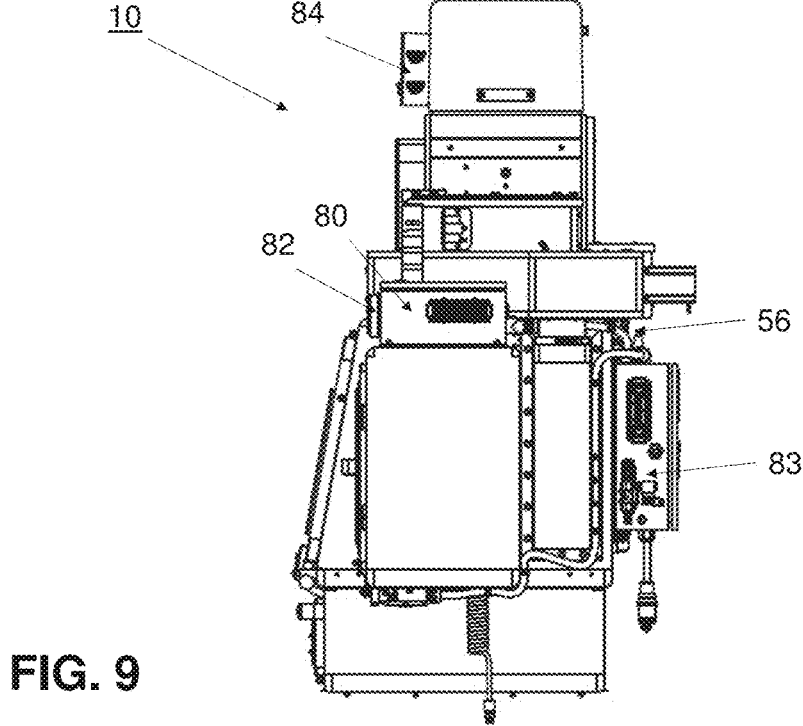
FIG. 9 is a side view of an embodiment of the present invention.

Below diverter housing 30 is main chamber 20 having a plurality of glove apertures 21 that each releasably engage a glove 22 (not shown). As would be understood by those in the art, main chamber 20 is where samples, for example chemical compounds, are manipulated by personnel. Main chamber 20 may include one or more pass thrus 24, as shown in FIG. 6.

Above bypass filter compartment 31 is outlet filter housing 60 which releasably secures at least one filter. In a preferred embodiment the compartment includes bag-in-bag-out "BIBO" filter 61 and secondary HEPA filter 62. In a preferred embodiment 61 and 62 are HEPA filters that are at least 99.995% efficient at the most penetrating particle size (mpps) and capable of maintaining that efficiency at the desired flow rate. Air flows from diverter housing 30 to main chamber 20, and from main chamber 20 to bypass filters compartment 31 via lateral flow air chase 42 and lateral flow main chamber outlet 45, respectively. It should be understood that these pathways are schematically represented in the figures to facilitate understanding the system, but that the actual pathways are not necessarily the outwardly bowing tubular structures depicted.

Figure 4:
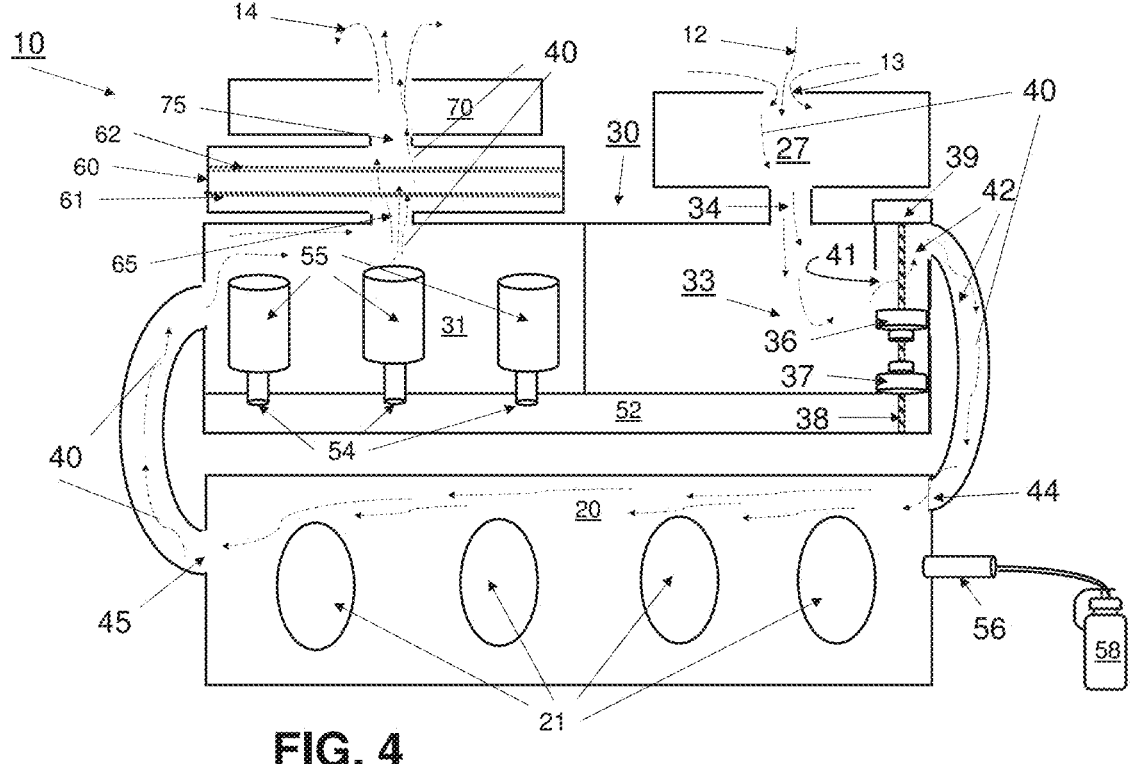
FIG. 4 schematically represents the present invention system in lateral air flow mode.

FIG. 4 depicts system 10 in lateral air flow mode. This mode would be appropriate where manipulations can be performed in filtered yet ambient air that is circulated through the system. An example of such a manipulation would be weighing a material that is stable in the presence of oxygen and not hygroscopic.

Figure 5:
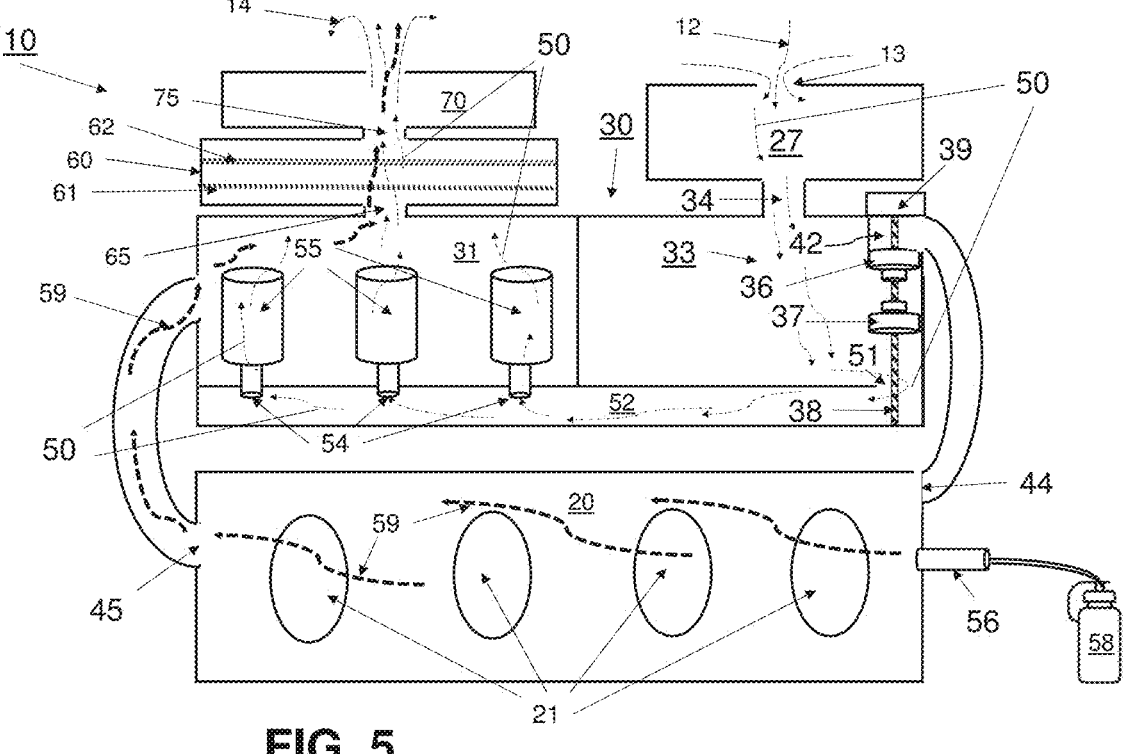
FIG. 5 schematically represents the present invention system in enhanced controlled environment mode.

Following lateral flow path 40 through system 10, ambient air 12 enters ambient inlet 13 and passes through intake 27 before passing through diverter inlet 34. From there lateral flow path 40 is directed into lateral flow chase inlet 41 then through lateral flow air chase 42. The path that the air takes, either lateral flow path 40 or bypass flow path 50 (see FIG. 5), is determined by the position of upper gate valve 36 and lower gate valve 37. More specifically, in lateral flow path 40 upper gate valve 36 does not encumber lateral flow chase inlet 41 but lower gate valve 37 blocks bypass air chase inlet 51 (shown in FIG. 4). The opposite is true for bypass flow path 50 as shown in FIG. 5. It should be understood that the actual orientation of gate valves 36 and 37 can vary so long as the result is simultaneously opening one path while closing another. Also, other mechanical systems can be used to produce this result. Examples of alternative mechanical systems include manually or motor driven gates, valves or dampers, and that these systems are within the scope of the invention.

Air in lateral flow path 40 from lateral flow air chase 42 enters main chamber 20 at lateral flow main chamber inlet 44, travels in a generally lateral course from one end of the chamber to the other, exits through lateral flow main chamber outlet 45 and enters bypass filters compartment 31. Air from bypass filters compartment 31 passes through filter housing inlet 65 into outlet filter housing 60 where it passes through additional filters. In a preferred embodiment those additional filters include BIBO filter 61 and secondary HEPA filter 62. Filtered air in lateral flow path 40 then enters exhaust fan inlet 75 which leads into exhaust fan 70 then exits the system as exhaust 14. Exhaust fan is preferably constructed to interface with the system and be capable of drawing enough air through the system to meet or exceed typical design standards for glovebox style enclosures. In a preferred embodiment the fan will have a variable speed controller that allows for adjustments based on customer needs and HEPA filter loading.

Airflow through the unit in lateral flow mode is typically at a rate sufficient to attain at least 100 linear feet per minute velocity through a glove port, but preferably to enable a working pressure inside the enclosure between negative 0.25 inches water column (63 Pa) and negative 0.50 inches water column (125 Pa), compared to ambient.

FIG. 5 depicts system 10 in enhanced controlled environment mode. This mode is unique because chamber 20 is fed solely by compressed gas 58, meaning the chamber environment is highly controlled with respect to reactivity and relative humidity, yet it is a net negative system due to a concurrent bypass flow. Enhanced controlled environment mode is ideal where manipulations should be performed in a tightly controlled environment, for example weighing a hygroscopic and toxic compound that is combustible in the presence of oxygen.

One of the two concurrent flow paths is bypass flow path 50, which enters system 10 at ambient inlet 13 as ambient air 12. It passes through intake 27, enters diverter inlet 34 then is directed to bypass air chase inlet 51. Note that bypass flow path 50 travels this route because upper gate valve 36 blocks lateral flow chase inlet 41 (FIG. 4) yet lower gate valve 37 leaves bypass air chase inlet 51 unencumbered. Air flows along bypass flow air chase 52, through bypass flow outlet ports 54 which feed into cylindrical filters 55, through previously described filters of outlet filter housing 60, through exhaust fan outlet 75 and exits the system as exhaust 14. It is noted that cylindrical filters 55 assist in providing resistance to bypass flow path 50, thereby creating the net negative pressure environment within chamber 20, but that other means for imparting resistance, such as non-filtering appliances having circuitous paths or reduced apertures are within the scope of the invention.

System 10 is in enhanced controlled environment mode when the bypass flow and compressed gas flow systems are operating concurrently.

Airflow through the unit in enhanced controlled environment mode is typically at a rate sufficient to attain at least 100 linear feet per minute velocity through a glove port, but preferably to enable a working pressure inside the enclosure between negative 0.30 inches water column (75 Pa) and negative 0.60 inches water column (150 Pa), compared to ambient.

The second of the two concurrent flow paths is compressed gas flow path 59, where compressed gas 58 enters main chamber 20 at compressed gas inlet 56, travels across the chamber to lateral flow main chamber outlet 45, enters filter bypass filters compartment 31, goes through filter housing inlet 65, passes through filters of outlet filter housing 60, past exhaust fan inlet 75 and exits the system as exhaust 14.

Compressed gas flow through the unit in enhanced controlled environment mode is typically at a rate sufficient to provide the desired environment within the main chamber within a reasonable time.

Among the unique structures and features in system 10 is the ability of the system to switch between lateral air flow mode and enhanced controlled environment mode. This is largely accomplished by system monitoring box 80. Referring to FIG. 6, system monitoring box 80 includes graphic user interface 82 which allows an operator to choose the mode and various operational parameters such as door lock deactivation, lighting controls, desired environment parameters, system function checks. These operator inputs effectuate a variety of mechanical reactions, for example rotating gate valve shaft 38 in order to drive gate valves 36, 37 into a desired position and, compressed gas injection and fan speed. These various mechanical functions are controlled and powered by primary power/control box 83 and/or secondary power/control box 84. It is noted that the system is configured for operator's input to determine the mode, but that the system will default to a specific mode where certain operation conditions exist, regardless of operator input. For example disconnecting compressed gas 58 to compressed gas inlet 56 defaults the system to ambient environment mode.

FIGS. 6-9 depict a preferred embodiment of the present invention in various views. These drawings include some desirable features of glovebox systems including pass thrus 24, HEPA filtered inlet air, angled door with integrated glove ports and interior lighting.

In a preferred embodiment system 10 conforms to at least the following standards and guidelines: ANSI ASHRAE-110 2016; ISO 14644-1 1999; ISO 14644-7 2004 and UL 508.

In typical good laboratory practice use, the unit will be set for the desired interior condition. Items required for performing the tasks, including, but not limited to, materials being manipulated, tools for operations and cleaning materials can be passed into the main chamber via the pass-thru. The operator will then perform the relevant tasks. Cleaning operations will be performed and all materials can be prepared for passing back out of the main chamber via the pass-thru.

Certain structures and components are disclosed for purposes of describing an embodiment, and setting forth the best mode, but should not be construed as teaching the only possible embodiment. Rather, modifications may be made without departing from the spirit and scope of the invention as set forth in the following claims. Examples of modifications include amber lighting for use with light sensitive compounds. It should be understood that all specifications, unless otherwise stated or contrary to common sense, are +/−10%, and that ranges of values set forth inherently include those endpoint values, as well as all increments between. By way of example "1 to 2 centimeters" includes 1 cm, 1.000001 cm, 1.000002 cm, and so forth. Also, "substantially" as used herein, shall mean generally. By way of example a "substantially planar" surface includes surface imperfections but is generally planar.

What is claimed is:

1. An air diverter system for use with a negative pressure containment system including:

A. A diverter housing including a diverter inlet defining an air path into said diverter housing, the air path emptying into a diverter assembly, wherein the diverter assembly is separated apart from a bypass filters compartment by a wall that divides the diverter housing into discrete separate spaces housed within the diverter housing;

B. A lateral flow air chase in fluid communication with said diverter housing, said lateral flow air chase for diverting air out of said diverter assembly and to a main chamber that forms a separate chamber than the diverter housing;

C. A bypass flow air chase in fluid communication with said diverter housing, said bypass flow air chase for moving air from a different region of said diverter assembly than the lateral flow air chase, and to the bypass filters compartment; wherein the diverter assembly allows air flow through the lateral flow air chase and the bypass flow air chase, with the lateral flow air chase situated in a vertical alignment between the diverter assembly and the main chamber; and D. the bypass flow air chase extending horizontally along a lower side of the diverter housing and emptying into filters within the bypass filters compartment;

E. A lateral flow main chamber outlet in fluid communication with the main chamber and the bypass filters compartment of the diverter housing, wherein air flow from the main chamber is directed to the bypass filters compartment and reenters the diverter housing.

2. The air diverter system of claim 1 wherein said diverter assembly includes at least one gate valve positioned on a gate valve shaft.

3. The air diverter system of claim 2 wherein said gate valve shaft is actuated by a gate valve shaft motor.

4. The air diverter system of claim 1 wherein said bypass flow air chase defines at least one bypass flow outlet port.

5. The air diverter system of claim 4 wherein at least one filter of the filters is engaged with said at least one bypass flow outlet port.

6. The air diverter system of claim 5 wherein said at least one filter is a cylindrical filter.

7. The air diverter system of claim 5 wherein said at least one filter releases filtered air into said diverter housing.

8. The air diverter system of claim 1 wherein said diverter housing is in fluid communication with a containment system having compressed gas.

9. The air diverter system of claim 1 wherein said bypass flow air chase is within said diverter housing.

* * * * *